March 7, 1939.　　　P. E. PEARSON　　　2,150,128
FISH-CUTTING MACHINE
Original Filed May 14, 1937　　8 Sheets-Sheet 3
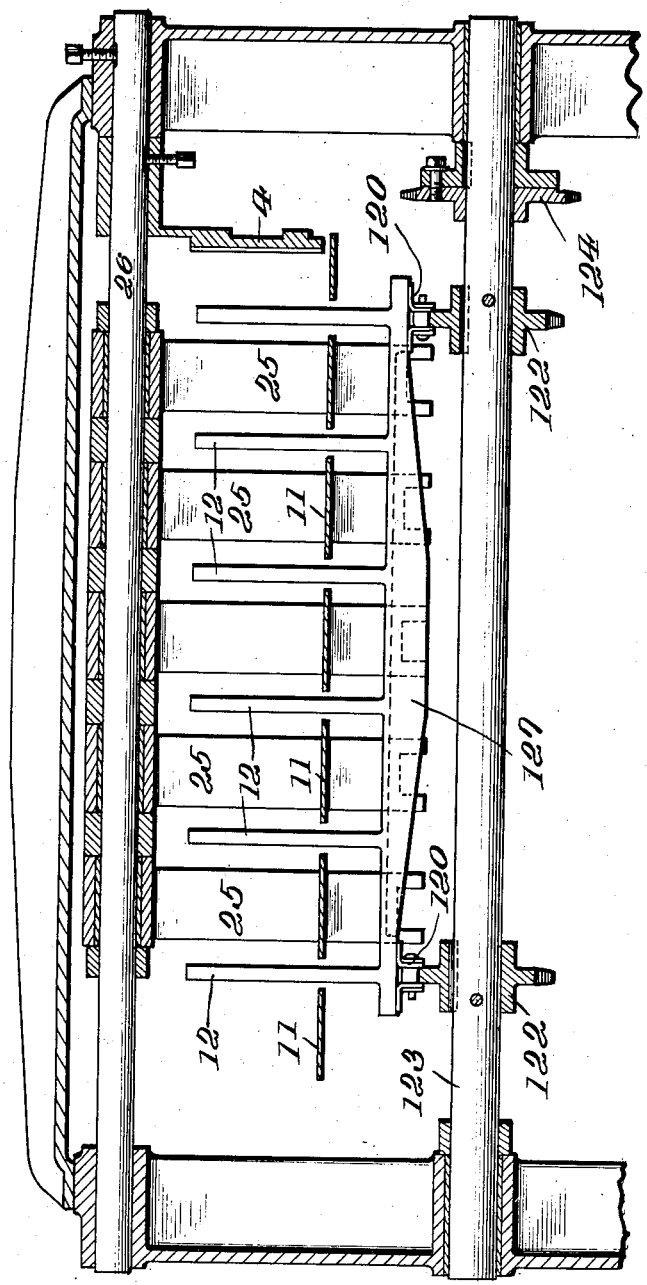
Inventor
Paul E. Pearson
By Mason & Porter
Attorneys

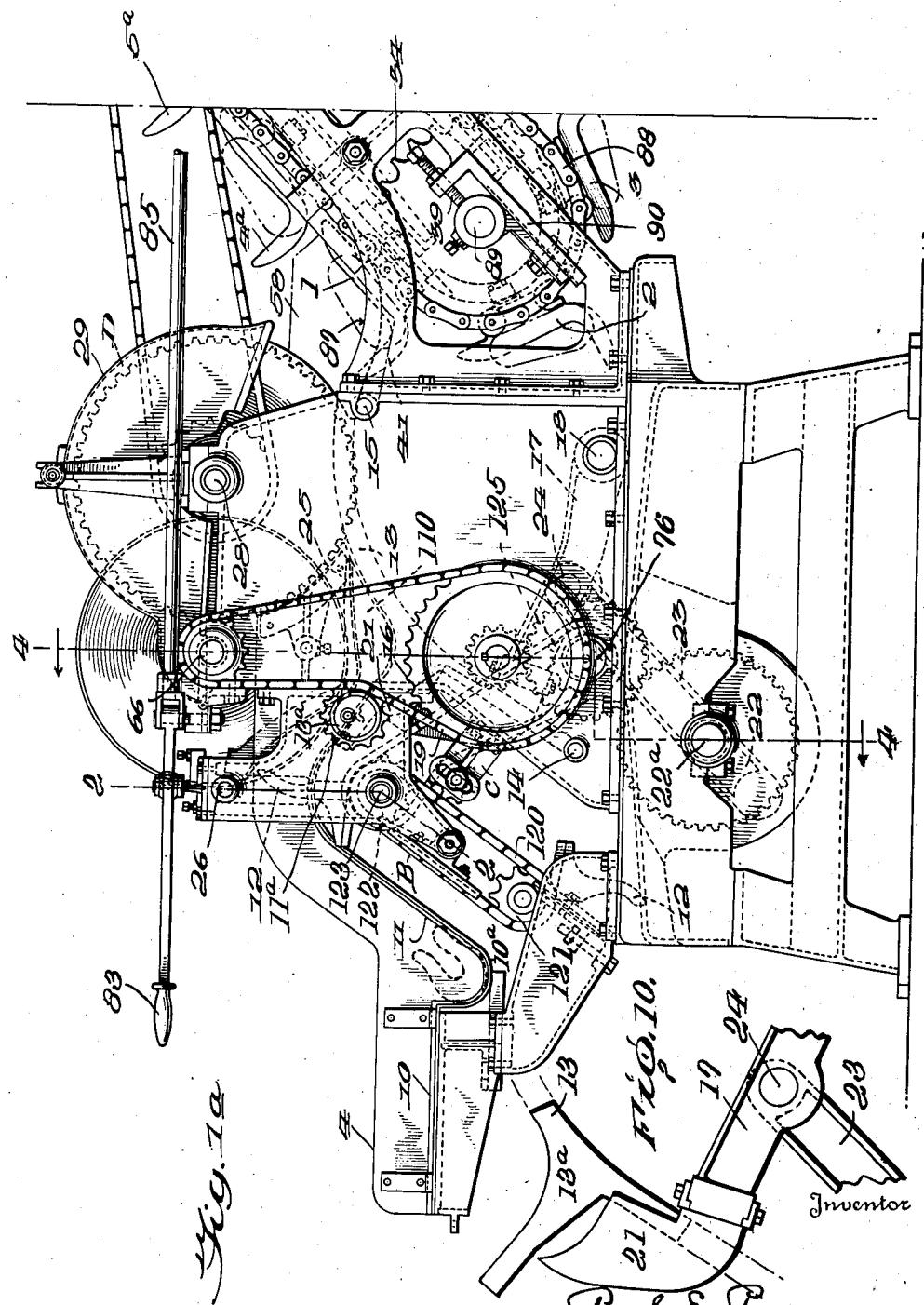

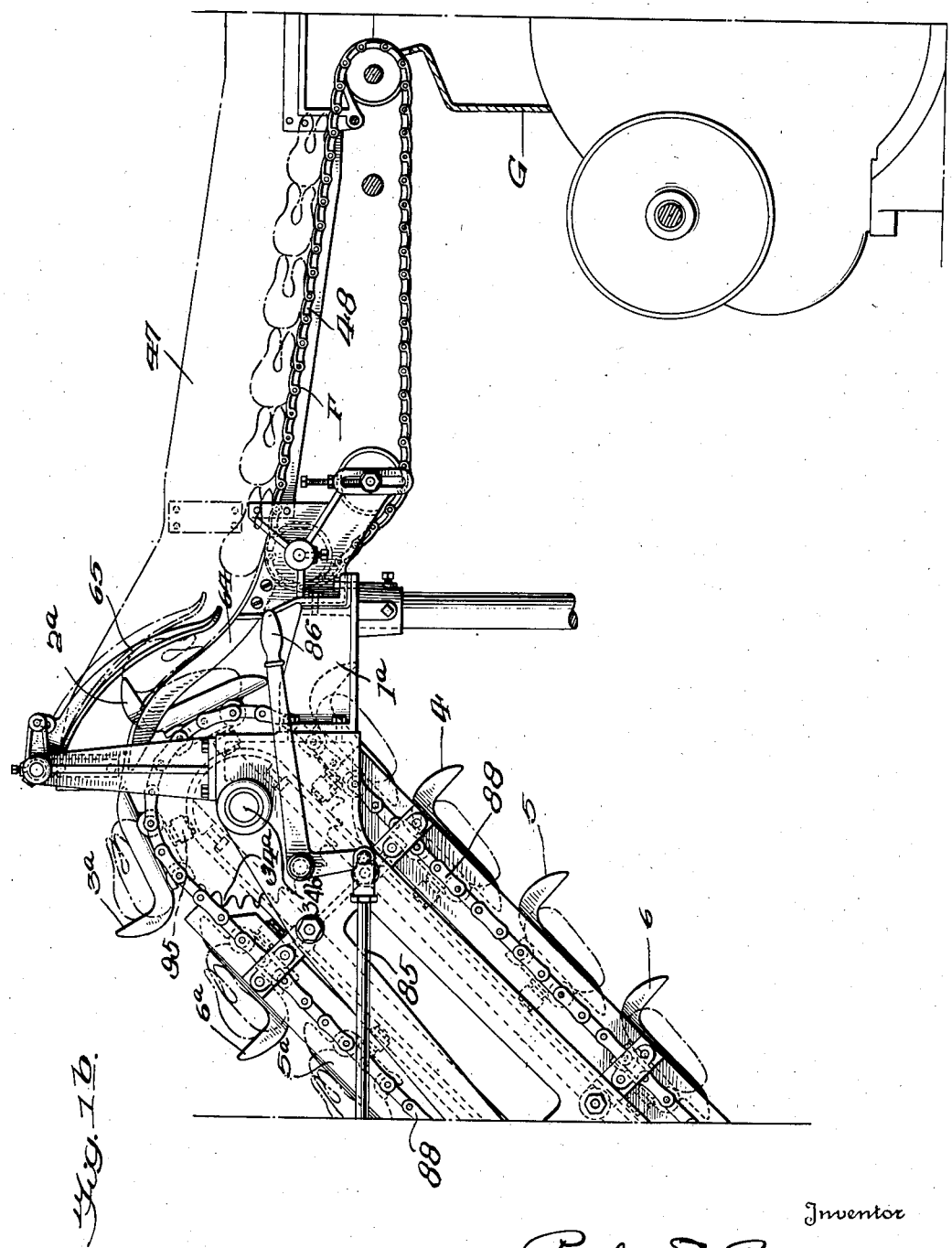

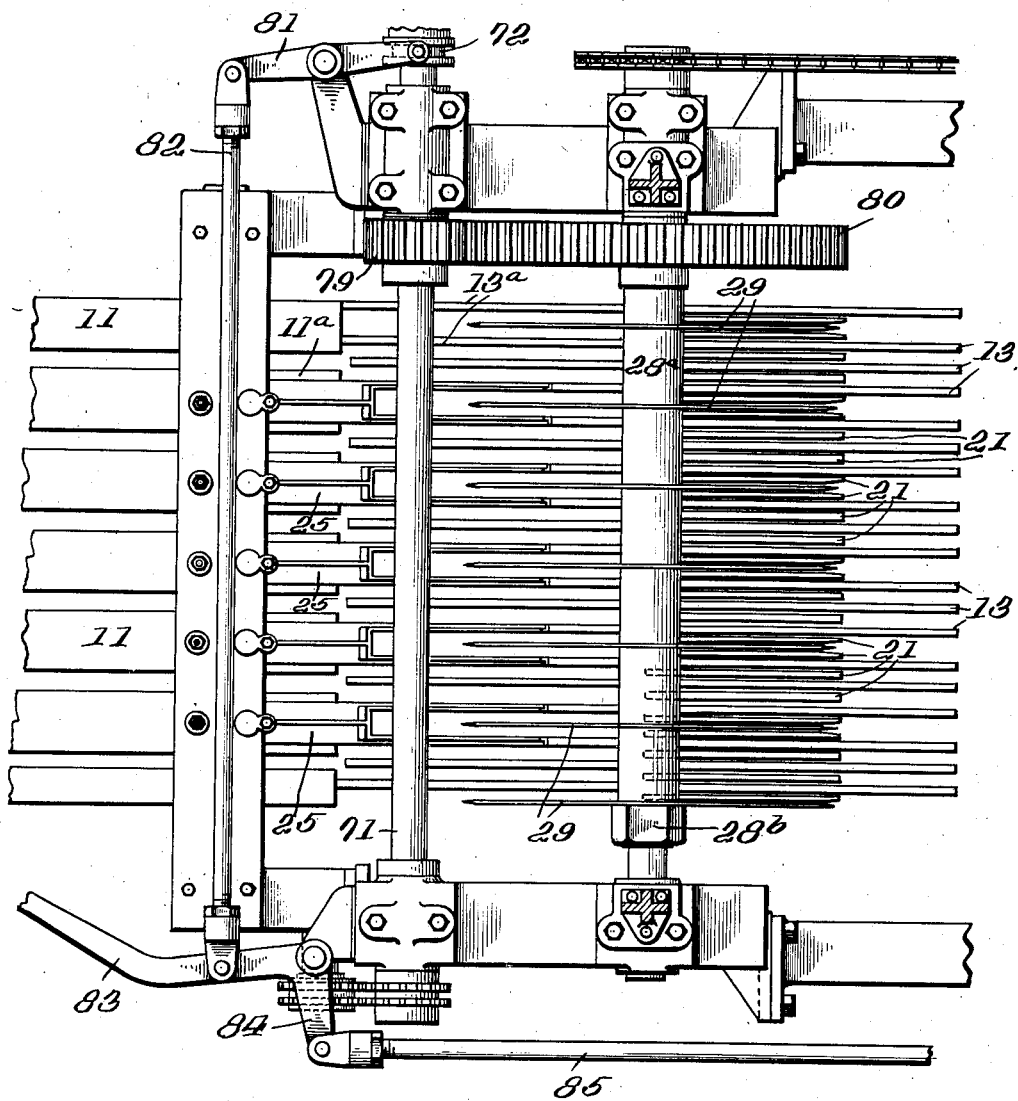

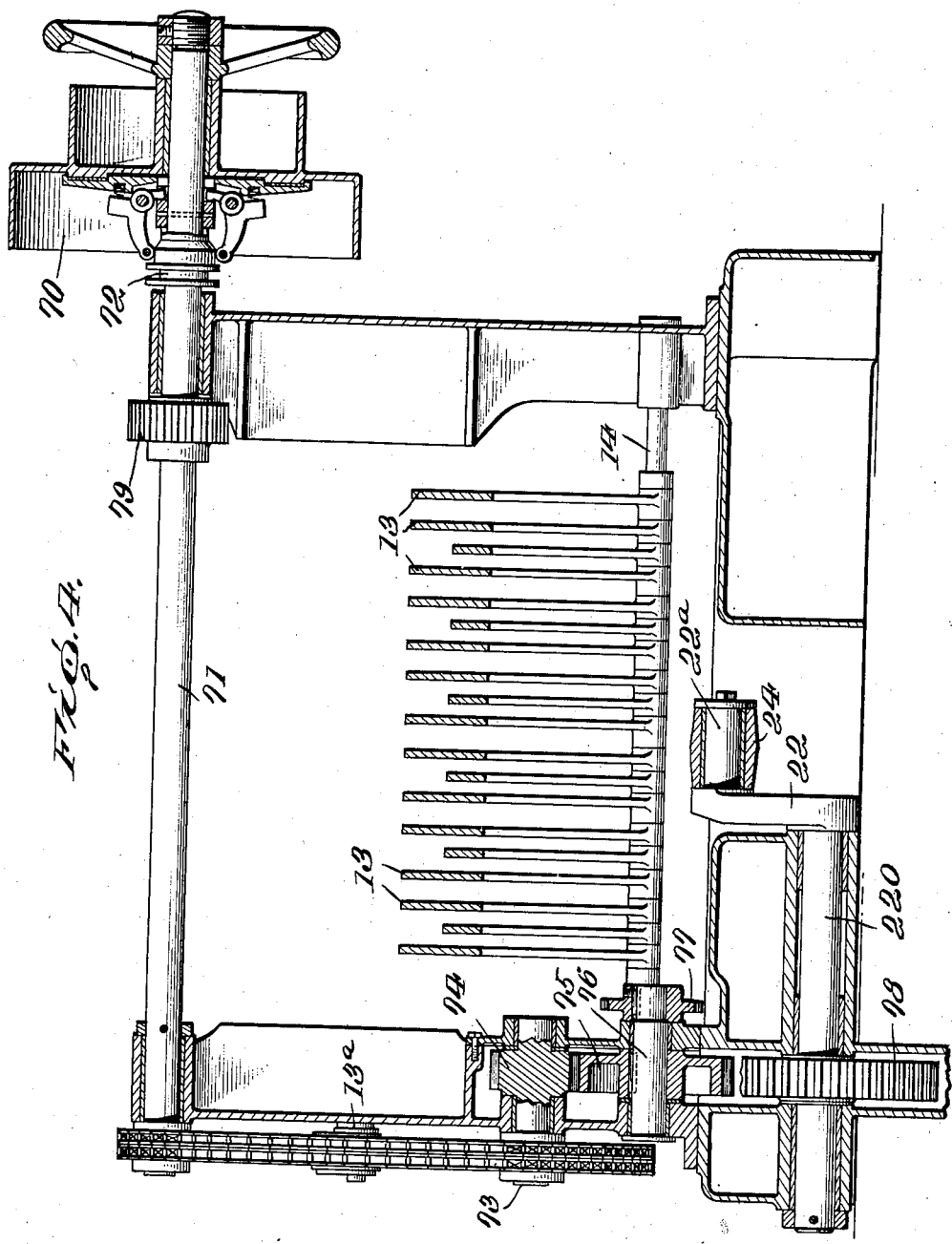

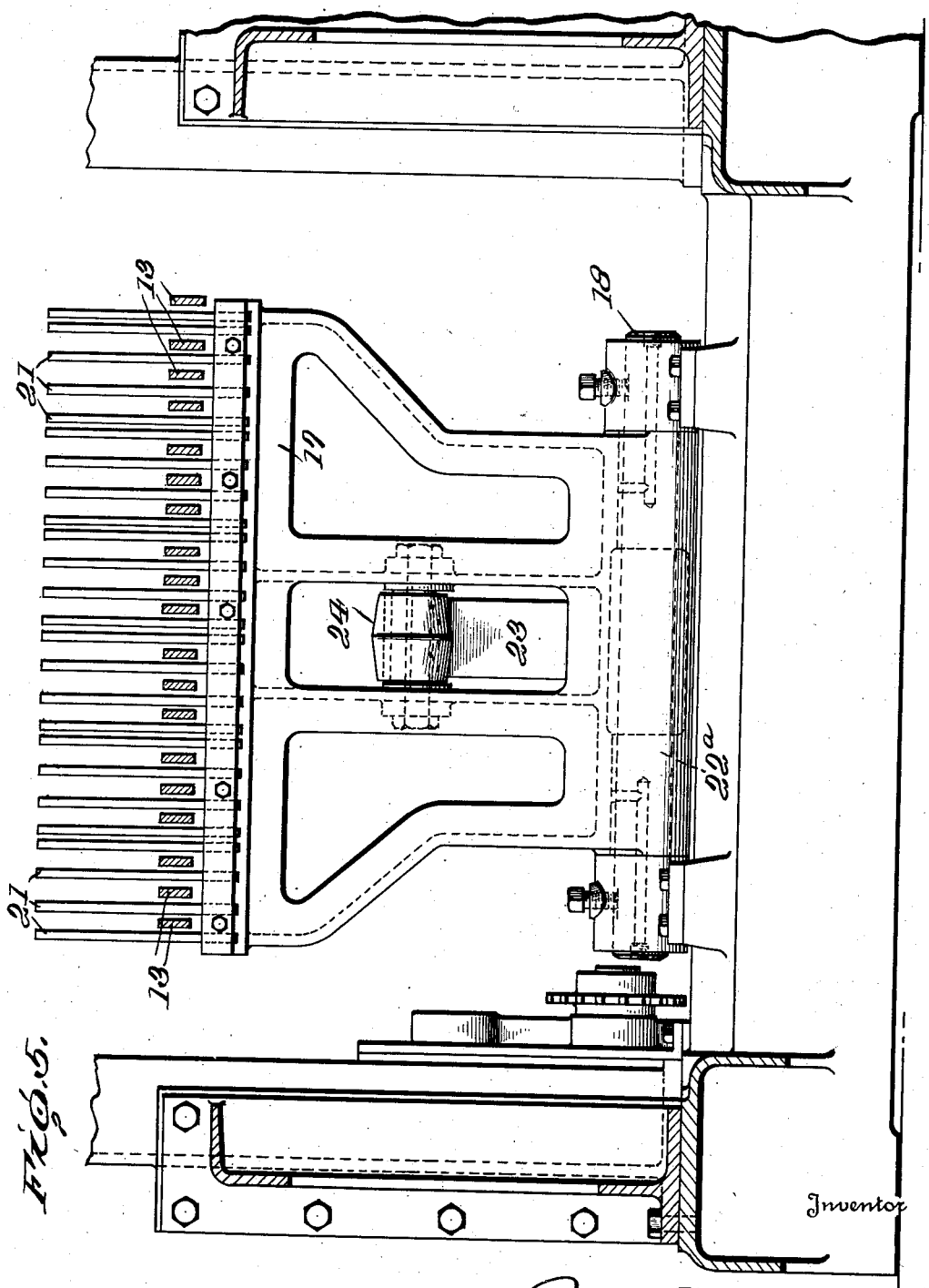

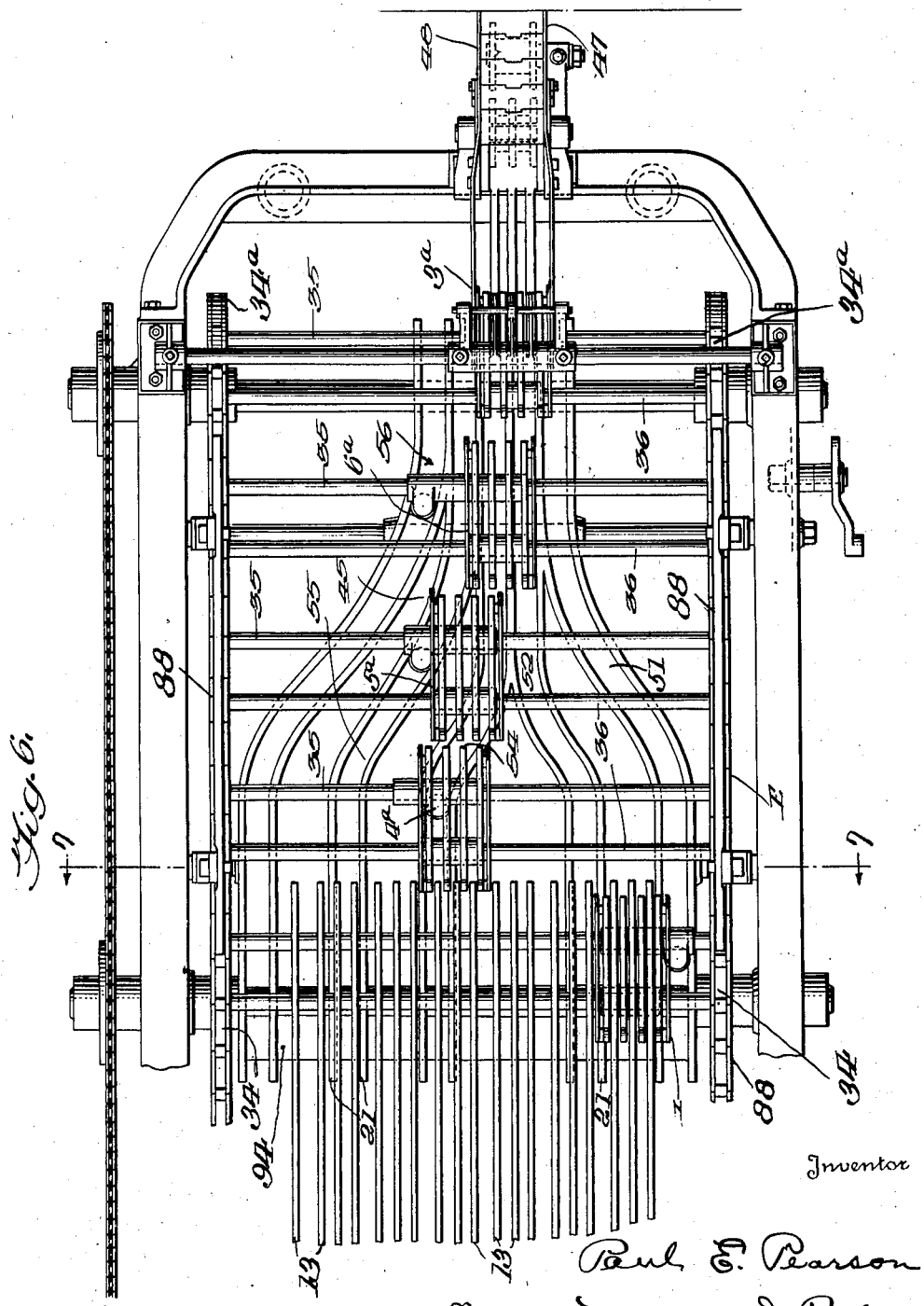

March 7, 1939. P. E. PEARSON 2,150,128
FISH-CUTTING MACHINE
Original Filed May 14, 1937    8 Sheets-Sheet 8
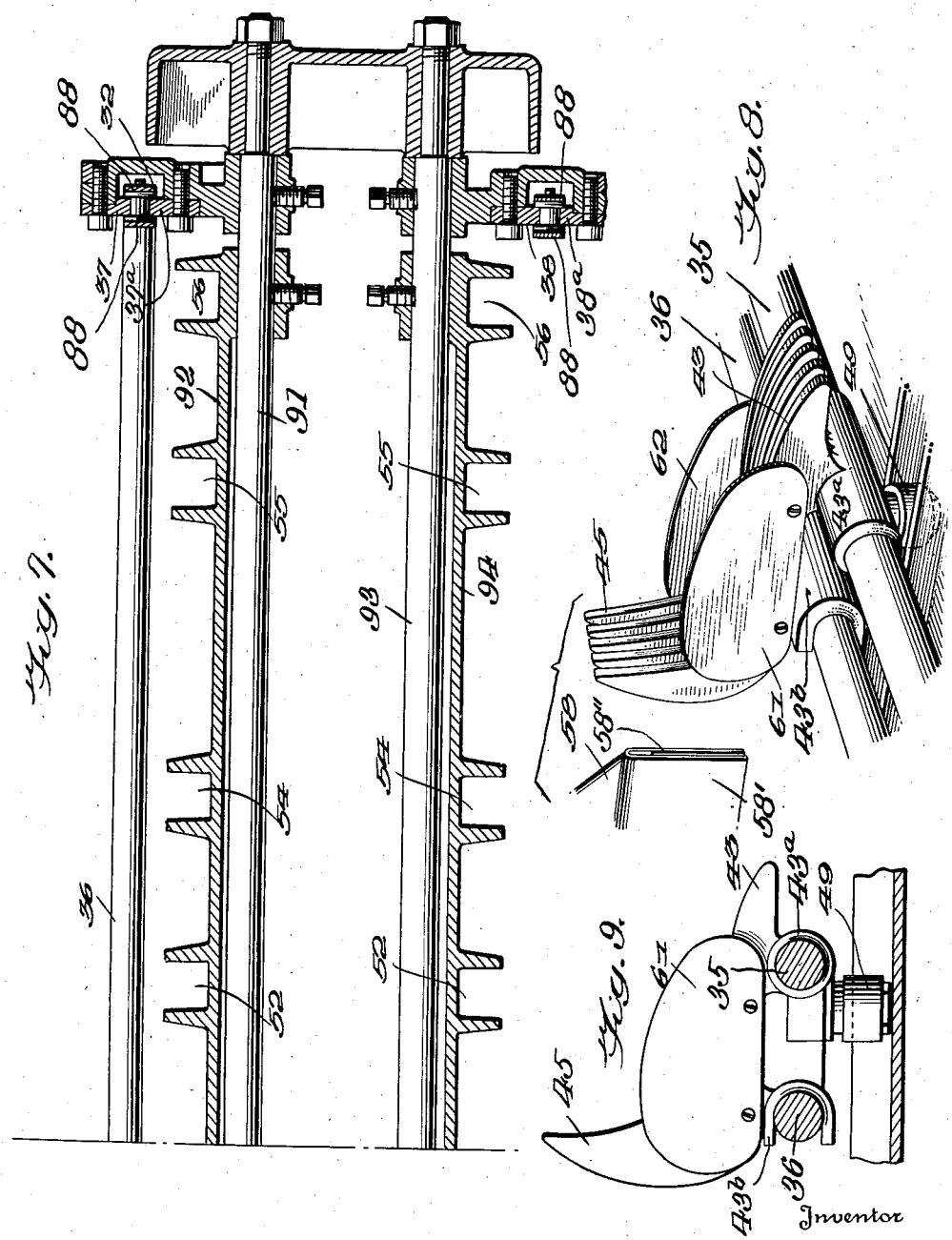
Inventor
Paul E. Pearson
By Mason & Porter
Attorneys Patented Mar. 7, 1939

2,150,128

UNITED STATES PATENT OFFICE 2,150,128

FISH-CUTTING MACHINE

Paul E. Pearson, Chicago, Ill., assignor to Continental Can Company, Inc., New York, N. Y., a corporation of New York Application May 14, 1937, Serial No. 142,699
Renewed January 23, 1939

14 Claims. (Cl. 17—4)

The invention relates to new and useful improvements in a fish cutting machine, and more particularly to a machine for cutting fish into can lengths and for conveying the cut lengths into a feed hopper of a filling machine. In the packing of fish in cans, it has been a common practice to cut the fish into lengths which are substantially equal to the height of the can and to insert these lengths endwise into the can. It is necessary, therefore, that the fish lengths be fed into the filling machine in a certain predetermined position so that they may be properly placed in the cans.

An object of the present invention is to provide a machine which operates automatically to cut the fish into can lengths and to deliver said cut lengths into the hopper of a filling machine by a movement of the fish and the cut lengths in substantially the same direction.

A further object of the invention is to provide a machine of the above type wherein the fish lengths are selectively fed from the cutting station into the filling hopper so that the choice lengths of the less choice lengths may be properly distributed to produce in the cans a uniform pack.

A still further object of the invention is to provide a machine of the above type wherein the fish is fed positively through the gang cutter and the cut lengths received and positively fed from the cutting station into the hopper.

A still further object of the invention is to provide a fish cutting machine wherein the cut lengths are taken from the cutting station by traveling buckets which are independently mounted on the conveyor therefor and so controlled that the buckets move into a tandem arrangement after the receiving the fish lengths for the delivery of the same to the conveyor which discharges the fish lengths into the hopper of the filling machine.

These and other objects will in part be obvious and will in part be hereinafter more fully disclosed.

In the drawings which show by way of illustration one embodiment of the invention—

Figure 1a is a side view of a portion of the machine embodying the improvements;

Fig. 1b is a side view of the remainder of the machine, so that Figures 1a and 1b show the complete machine in side elevation;

Fig. 2 is a sectional view on the line 2—2 of Fig. 1a;

Fig. 3 is a plan view of the portion of the machine in the region of the cutting knives;

Fig. 4 is a sectional view on the line 4—4 of Fig. 1a;

Fig. 5 is a sectional view showing the fish pushers which move the fish along the supporting bars into and through the cutting knives, the bars supporting the fish being shown in section;

Fig. 6 is a plan view showing the buckets and the means for supporting and operating the same whereby the fish lengths are taken from the fish cutting station and delivered to the conveyor that discharges the same into the hopper;

Fig. 7 is a sectional view through the cam tracks for guiding the buckets;

Fig. 8 is a perspective view of one of the fish buckets, the supporting rods therefor, and one of the partitions for guiding the buckets when they receive the fish length at the cutting station;

Fig. 9 is a detail in section through the supporting rods and the cam track, also showing the roller for controlling the lateral movement of the bucket; and Fig. 10 is a detail showing in side view the pusher plates which carry the fish between the cutting knives.

The invention is embodied in a fish cutting machine for cutting fish into can lengths and for conveying the can lengths from the cutting station into the hopper of the filling machine. The fish are placed on a table and are removed therefrom one at a time by the operator who places the same in a receiving pocket with the gill end of the fish in contact with a guiding plate. The support for the fish at the receiving pocket and leading therefrom is in the form of flat spaced plates. Located beneath the supporting plate which inclines upwardly is a traveling elevator including a series of arms which project through the spaces between the plate and which contact with the fish and carry it along the plates, finally delivering the same on to supporting bars that are spaced from each other and which extend through the fish cutting station. At the fish cutting station is a series of cutting knives spaced so as to cut the fish into can lengths. As illustrated, the machine is equipped for cutting the fish into six can lengths. The first can length extends from the gill end of the fish into the body thereof. While the machine is intended to operate upon fish of a size so as to produce six can lengths, it will be understood, of course, that the machine is adapted to operate upon fish of smaller size and cut five lengths, or four lengths, or even three lengths, but the gill end of the fish, regardless of its size, is always placed against the guide plate which directs the fish so that the first length of fish cut from the gill end is a full can length. The fish is moved positively through the gang cutters by pushers which receive the fish from the elevator.

Cooperating with these pushers are presser plates which hold the fish firmly against the supporting bars until they are contacted with by the cutters. After the fish is cut into lengths, a traveling bucket takes each fish length and positively moves the same forward and delivers the same on to a conveyor leading to the filler. Certain of these buckets have a lateral movement as they move forward so that they will arrange themselves in tandem one directly behind the other. The buckets are preferably controlled so as to selectively carry the fish lengths to the conveyor for the hopper. For example, the fish lengths may be taken away from the cutting station in the following order. First, the length at the gill end of the fish, then the second cut length next to the gill end, then the third cut section, following with the tail end of the fish, then the section next to the tail end, and finally the fourth section in the body portion of the fish. Thus it is that the fish lengths are so distributed as to produce a uniform pack.

It is thought the invention will be better understood by a detail description of the illustrated embodiment thereof. At the left-hand end of the machine as viewed in Fig. 1a, is a supporting table indicated at 10. The fish are delivered on to this table by a gravity chute from a storage bin, and are taken one at a time by an operator and placed in the grid pocket 10a. This pocket is formed by plates 11 which are spaced from each other as shown in Fig. 2. Extending along the end of the table and along the plates 11 is a guiding member 4. The plates 11 from the grid pocket 10a extend in an upward direction and are thence curved downwardly, terminating at 11a adjacent a series of bars 13 (see Figs. 1a and 5), which serve as a supporting means for the fish. These bars 13 have upwardly extending sections 13a which receive the fish from the plates 11 (see Figures 1a and 3). The bars 13 are mounted at one end on a rod 14. The bars extend past the cutting head which is indicated at D in the drawings. The cutting head includes a series of cutting knives 29. These knives are mounted on a shaft 28 and are spaced from each other by suitable collars 28a placed on the shaft, one of which is secured firmly to the shaft. The knives are pressed against this fixed collar by a nut 28b (see Fig. 3).

After the fish is placed in the pocket 10a it is moved along the plates 11 by an elevator which includes chains 120, 120 running over sprocket wheels 121 and 122. There are two sprocket wheels for each chain. The sprocket wheels 122 are mounted on a shaft 123 which is driven by a sprocket wheel 124 (see Figures 1a and 2). The sprocket wheel 124 is driven by a sprocket chain 125 carried by a shaft 76. Extending between the chains 120 are two bars 127, 127 (see Fig. 2). Each bar carries a plurality of arms 12, and these arms extend between the spaced plates 11 and contact with the fish and move the fish along the plates. As noted, there are two bars and two sets of arms which operate in succession for receiving and delivering the fish along the supporting plates 11.

The plates 11 extend upwardly and thence curve downwardly. Mounted on the rod 26 are a series of pressure levers 25 (see Figures 1a and 2). The pressure levers 25 are rigidly secured to the rod 46 and possess sufficient inherent resiliency for holding said pressure levers in contact with the fish and the fish in contact with the inclined plates. The pressure lever is forked at its free end as shown in Fig. 3, and the forked ends of each pressure lever straddle the cutter knife with which it is associated. The elevator carries the fish forward up the inclined plates and forces the same beneath the pressure levers and into a grid pocket indicated at 110 in Fig. 1a of the drawings. Fish pushers now take the fish from the grid pocket 110 and force the fish on to and through the cutting knives. These pushers are in the form of blades 21. As clearly shown in Fig. 5 of the drawings, the blades are supported by a swinging supporting bracket 17. The blades 21 are clamped to this supporting bracket and are so disposed that there is a blade passing close to each side of the cutting knives and two other blades passing centrally between adjacent cutting knives. These blades extend up between the bars 13 on which the fish is supported. The swinging bracket is pivotally mounted on the shaft 18. A link 23 is pivoted to a pin 24 carried by the swinging bracket 17. This link at its other end engages a crank pin 22a carried by a crank 22 mounted on the end of a shaft 220. This shaft is rotated by a suitable mechanism which will be briefly referred to hereinafter, and as the shaft rotates, it swings the bracket 17 and causes the blades 21 to contact with the fish in the grid pocket 110 and carry the same from beneath the pressure levers on to the cutting knives so that the fish is cut into can lengths. The distance between adjacent knives is a can length and by changing the collars between the cutting knives after the nut 28b has been removed from the shaft, the spacing of the cutting knives can be varied to suit different heights of cans. The bars 13 can also be shifted on the supporting means therefor so as to adjust the machine for cutting fish into lengths corresponding to the height of the can in which the fish is to be packed.

The machine is driven, as illustrated, by a belt wheel 70 which is connected to the main driving shaft 71 by a suitable manually operated clutch 72. The shaft 71 through a suitable sprocket drive operates the shaft 73. Mounted on the shaft 73 is a gear 74 which meshes with a gear 75 on a shaft 76. A sprocket wheel 77 mounted on the shaft 76 engages the sprocket chain 125 which drives the elevator arms. The gear 75 meshes with a gear 78 on the shaft 220, and this drives the crank 22 and thus swings the bracket carrying the pusher blades.

Mounted on the shaft 71 is a gear 79 which meshes with a gear 80 carried by the shaft 28 supporting the cutting knives. The clutch 72 is manually controlled by means of a lever 81 which is connected to a rod 82. This rod 82 extends across the machine and is in turn connected to a hand lever 83. When the hand lever is moved, the rod will be shifted endwise and this will shift the clutch either for driving or stopping the machine. The hand lever 83 is provided with an arm 84 to which a link 85 is connected, and this link 85 is in turn connected to a lever controlled by an arm 86 so that the machine may be started or stopped by the operator manipulating the arm 86.

From the above it will be apparent that the fish are placed one at a time in the grid pocket 10a and are carried along the supporting plates 11 by the elevator arms 12, and thus the fish is positively moved beneath the pressure levers and into range of the travel of the pusher blades 21. The pusher blades now carry the fish positively forward from the grid pocket 110 against the cutting blades, so that the fish is severed into can lengths. The bars 13 extend beyond the cutting blades and form a grid pocket 87. Located in alinement with the cutting blades at the discharge side of the machine are partitions 58. The fish lengths are carried by the pusher blades through the knives and into the pocket 87. These partition plates serve to separate the lengths from each other and retain the same in a predetermined position lengthwise of the fish. When the fish is of proper size, it will be cut into six lengths which may be designated, beginning with the gill end, as *a*, *b*, *c*, *d*, *e*, and *f*. After the fish passes through the gang knives, that is, the fish cutting station, into the pockets 87, then each length is taken by a bucket and delivered thereby on to a conveyor which discharges the fish lengths into the hopper of the filling machine.

The conveyor buckets include a series of plates 43 with upstanding extensions 45, which plates are spaced so that they pass between the supporting bars 13. These plates are attached to a sleeve 43a and a bracket 43b. The sleeve 43a is mounted on a bar 35 and the bracket 43b is mounted on a bar 36. Attached to the plates 43 are side pieces 61 and 62. These form a pocket for the fish length. The fish length lies in the pocket with one cut end adjacent the side piece 62 and the other cut end adjacent the side piece 61. There is a pair of bars 35 and 36 for each bucket. These bars are connected to links 88 which are in turn connected together so as to form an endless chain. The links are spaced and the ends of the bars are reduced so as to pass between plates 37 and 37a carried by the frame of the machine (see Fig. 7). The other ends of the bars are similarly connected by links mounted to slide between similar plates. The links pass each side of the plates and this serves as a housing and a support for the links and the rods. The links run over a sprocket wheel 34 at the lower end of the frame extension of the machine and over a sprocket wheel 34a on the shaft 34b at the upper end of the frame extension. On the return, the ends of the bars pass between plates 38 and 38a. There is a sprocket wheel 34 at each side of the machine, and these sprocket wheels are carried by a shaft 89. The shaft 89 is mounted in a bracket 90 slidable in the frame extension. A screw 39 at each side of the frame extension bears against the sleeve in which the shaft 89 is mounted and serves as a means for moving the shaft to take slack out of the endless conveyor formed by the links 88.

Mounted in the frame is a bar 91 carrying a plate 92 having cam tracks therein. Mounted on the bar 93 is a similar plate 94 having cam tracks therein. As shown in the drawings, there are twelve of these buckets forming, in effect, two series of buckets. One of the series is numbered 1, 2, 3, 4, 5, 6, and the other series is numbered 1a, 2a, 3a, 4a, 5a, 6a. The buckets as they pass between the partitions 58 are disposed so that buckets 1 and 1a will take the section *a* at the gill end of the fish; 2 and 2a take the section *b* next to the gill section; 3 and 3a take the next section *c*, and so on, the buckets 6 and 6a taking the tail section *f*. The buckets 1 and 1a are each provided with a roller which runs in the cam track 51. The buckets 2 and 2a are provided with rollers running in the cam track 52. The buckets 3 and 3a are fixed to the rods and have no lateral movement. The buckets 4 and 4a are provided with rollers running in the cam track 54. The buckets 5 and 5a are provided with rollers running in the cam track 55, and the buckets 6 and 6a are provided with rollers running in the cam track 56.

Referring to Fig. 6 of the drawings, it will be noted that buckets 1a and 2a have taken the fish lengths and discharged the same into the conveyor 48 which lead to the filling machine. The conveyor travels between side plates 47. The bucket 3a which is fixed and travels in a line passing centrally through the conveyor, is about to discharge a fish length carried thereby on to the conveyor. The bucket 6a which took the tail end section of the fish follows the bucket 3a and moves laterally until it is directly behind the bucket 3a, or in alinement with the conveyor for discharging the fish length carried thereby into the conveyor leading to the filler. The bucket 5a took the section next to the tail length, and is moving laterally so as to be directly behind the bucket 3a as shown in this Figure. The bucket 4a took the section on the tail side of the center of the fish and is also moving laterally into alinement with the advance buckets. Thus it is that the buckets are all caused to move laterally as they are advanced through the control of the cam tracks until they line up in tandem at the point of discharge, all passing the discharge point in alinement with the conveyor that leads to the filler. The head section is placed between two body sections of choicer lengths. Likewise, the tail section is placed between two body sections of choicer lengths, and therefore, the fish lengths are selected and distributed so as to produce a more uniform product as packed in the cans.

It is obvious, of course, that other ways of selecting the fish lengths may be accomplished on the machine, as these buckets are readily removed and placed in a different order in their line of travel.

The partitions 58 are made of sheet metal bent upon itself so as to provide two spaced walls 58' and 58''. The side members 61 and 62 pass in between the side members of the partition 58 so that when the bucket is moving in engagement with the fish section, these side plates do not contact therewith until a fish length is well back in the bucket and contacted with by the upwardly projecting plates 45. This insures a positive placing of the fish length in the bucket with the cut ends adjacent the side plates 61 and 62. The conveyor for delivering the fish lengths into the hopper of the filling machine is indicated at F in the drawings. It is in the form of connected links and plates running over suitable supporting rollers, one of which is driven from the filling machine. Bars 64 at the delivery end of the traveling buckets are spaced so that the plates of the buckets pass between the bars and the bars serve to strip the fish lengths from the buckets. There are presser bars 65 carried by the frame of the machine resting on the fish lengths and holding the lengths in contact with the bars 64 as they are stripped from the buckets. The bars or grids at the discharge ends of the buckets are inclined downwardly so that the fish lengths will move down on to the conveyor and be carried forward and delivered to the hopper of the filling machine which is indicated diagrammatically at G in Figure 1b of the drawings. It is noted that the fish lengths are delivered on to the conveyor F with the cut ends at the sides of the conveyor, and this is the proper position for the cut length of fish so that it will be finally placed in the can by an endwise movement of the fish length. There are control cam tracks on the under side of the frame supporting the links carrying the buckets and also cam tracks at the ends of the frame, so that the buckets are always under control and they are properly moved so as to receive the fish lengths at the cutting station and deliver the same into the conveyor which leads to the filler.

It will be noted from the above that a fish cutting machine has been provided wherein the fish lengths are taken from the gang cutting means one at a time and moved forward in the same general direction that the fish is moved on to the cutting means. The fish lengths as they are advanced are moved laterally of their path of travel until they are brought one directly behind another at the point of discharge, and at the discharge point they are delivered to a receiving means leading to the filler which is so dimensioned that the can lengths lying transverse of their path of travel have their cut ends in alinement. This greatly simplifies the conveying means and insures that the cut lengths by the positive handling of the same are properly placed in the hopper of the filling machine.

The fish, as noted above, are delivered on to the supporting table 10 and are taken one at a time and placed in the receiving pocket 10a. The elevator removes the fish from the receiving pocket, carrying it along the supporting plates so that it is placed beneath the pressure levers. It is moved along the spaced supporting bars by the oscillating pressure plates which contact with the fish and remain in contact therewith until the fish lengths pass from the cutting disks and into the receiving pocket where the cut lengths are transferred to the buckets. The buckets, as noted above, take the fish lengths one at a time from this receiving pocket and place the fish lengths in the desired order one behind the other and deliver the same at the same point into the receiving means which is associated with the filling machine.

While, as illustrated, the machine is arranged to cut the fish into six lengths, it will be understood that it can be readily enlarged and cutters added, also buckets for carrying away the cut lengths so that larger fish may be cut into a greater number of lengths, and it can also be reduced in size by omitting some of the cutting blades, if desired, for cutting smaller lengths of fish. It is also obvious that the buckets can be shifted so that the cut lengths can be distributed in any desired way in the cans. It is also obvious that many changes may be made in the details of construction without departing from the spirit of the invention as set forth in the appended claims.

Having thus described the invention, what I claim as new and desire to secure by Letters Patent, is—

1. A fish cutting machine comprising means for simultaneously cutting the fish into can lengths, means for feeding the fish to and from the cutting means, and independent devices for receiving simultaneously the cut lengths of fish from the cutting means and for delivering the cut lengths one at a time in succession to a filling machine.

2. A fish cutting machine comprising means for simultaneously cutting the fish into can lengths, means for feeding the fish to and from the cutting means, and devices for selectively conveying the cut lengths of each fish from the cutting means and delivering the same to a filling machine so that the gill length and tail length will be distributed among the choicer can lengths of said fish.

3. A fish cutting machine comprising means for simultaneously cutting the fish into can lengths, means for feeding the fish to and from the cutting means, independent devices for simultaneously receiving the cut lengths of fish from the cutting means and delivering the same to a filling machine, and means for cooperating with said devices for causing the same to move into alinement and discharge the cut lengths in succession to said filling machine.

4. A fish cutting machine comprising means for simultaneously cutting the fish into can lengths, means for feeding the fish to and from the cutting means, and devices movable in the same general direction as said feeding means for conveying the cut lengths one at a time from the cutting means to a single point of delivery to a filling machine, said devices being controlled and timed in their movement so as to deliver the cut lengths in succession with the lengths lying transverse to the path of travel.

5. A fish cutting machine comprising means for simultaneously cutting the fish into can lengths, means for feeding the fish to and from the cutting means, means for receiving and directing the cut lengths to a filling machine, said receiving means being dimensioned so as to receive and guide the fish lengths one after another positioned transversely of the path of movement of the fish lengths, and devices for conveying the cut lengths one at a time from the cutting means and delivering the same in succession into the receiving means.

6. A fish cutting machine comprising means for simultaneously cutting the fish into can lengths, means for feeding the fish to and from the cutting means, means for receiving and directing the cut lengths to a filling machine, said receiving means being dimensioned so as to receive and guide the fish lengths one after another positioned transversely of the path of movement of the fish lengths, individual buckets, one for each fish length, and means for operating said buckets whereby the fish lengths are taken one at a time from the cutting means and delivered in succession to the receiving means.

7. A fish cutting machine comprising means for simultaneously cutting the fish into can lengths, means for feeding the fish to and from the cutting means, means for receiving and directing the cut lengths to a filling machine, said receiving means being dimensioned so as to receive and guide the fish lengths one after another positioned transversely of the path of movement of the fish lengths, separately mounted buckets, one for each fish length, means for moving said buckets in the same general direction as the feeding means, and means for moving the buckets laterally during their forward movement whereby the fish lengths are taken one at a time from the cutting means and delivered in succession to the receiving means.

8. A fish cutting machine comprising means for simultaneously cutting the fish into can lengths, means for feeding the fish to and from the cutting means, individual buckets, one for each fish length, a supporting means for said buckets traveling in the same direction as the feeding means, said buckets being disposed on the supporting means so as to receive one fish length at a time, and means for moving said buckets laterally on the supporting means therefor whereby said buckets discharge the fish lengths contained therein in succession at the same point.

9. A fish cutting machine comprising means for simultaneously cutting the fish into can lengths, means for feeding the fish to and from the cutting means, individual buckets, one for each fish length, a supporting means for said buckets traveling in the same direction as the feeding means, said buckets being disposed on the supporting means so as to receive one fish length at a time, and means for moving said buckets laterally on the supporting means therefor whereby said buckets discharge the fish lengths contained therein in succession at the same point, said buckets being disposed on the supporting means therefor so that the gill length and the tail length are distributed among the choicer lengths of the fish as discharged into the filling machine.

10. A fish cutting machine comprising means for simultaneously cutting the fish into can lengths including a plurality of rotating cutting disks, spaced bars for supporting the fish while passing through the cutting means, pusher plates for pushing the fish on to and through the cutting disks, a partition disposed in rear of each cutting disk for guiding and separating the fish lengths from each other, a bucket for each fish length, and means for supporting and moving the buckets between the partitions for removing the fish lengths therefrom and for delivering the same in succession to a filling machine.

11. A fish cutting machine comprising means for simultaneously cutting the fish into can lengths including a plurality of rotating cutting disks, spaced bars for supporting the fish while passing through the cutting means, pusher plates for pushing the fish on to and through the cutting disk for guiding and separating the fish lengths from each other, a bucket for each fish length, means for supporting and moving the buckets between the partitions for removing the fish lengths therefrom and for delivering the same in succession to a filling machine, each bucket having side plates and each partition being formed of spaced plates between which the side plates of the buckets pass so as to insure that the fish length will be located in the bucket before it is moved from between the partition plates.

12. A fish cutting machine comprising means for simultaneously cutting the fish into can lengths including a plurality of rotating cutting disks, spaced bars for supporting the fish while passing through the cutting means, pusher plates for pushing the fish on to and through the cutting disks, a partition disposed in rear of each cutting disk for guiding and separating of the fish lengths from each other, a bucket for each fish length, means for supporting and moving the buckets between the partitions for removing the fish lengths therefrom and for delivering the same in succession to a filling machine, each bucket including spaced plates with upward extensions at the rear thereof, and a plate at each side of said bucket, the space between the side plates being substantially a can length so as to receive a fish length and hold the same in a predetermined position in the bucket.

13. A fish cutting machine comprising means for simultaneously cutting the fish into can lengths including a plurality of rotating cutting disks, spaced bars for supporting the fish while passing through the cutting means, pusher plates for pushing the fish on to and through the cutting disks, a partition disposed in rear of each cutting disk for guiding and separating the fish lengths from each other, a bucket for each fish length, means for supporting and moving the buckets between the partitions for removing the fish lengths therefrom and for delivering the same in succession to a filling machine, each bucket including spaced plates with upward extensions at the rear thereof, and a plate at each side of said bucket, the space between the side plates being substantially a can length so as to receive a fish length and hold the same in a predetermined position in the bucket, each partition being formed of spaced plates between which a side plate of the bucket travels so that the fish length will be placed in the bucket against the upward extensions before the fish length is removed from the pocket.

14. A fish cutting machine comprising means for simultaneously cutting the fish into can lengths, means for feeding the fish to and from the cutting means, a conveying means for conveying the cut lengths one at a time from the cutting means and delivering the same in succession at a single point into the filling machine, said conveying means including pairs of spaced bars, a bucket mounted on each pair of bars, and traveling therewith, said buckets being dimensioned so as to receive a single fish length, and cam tracks for controlling the position of the buckets on said bars whereby the fish lengths are selectively removed from the cutting means and the gill length and tail length of the fish distributed among the choicer body lengths of the fish prior to the delivering of the same to the filling machine.

PAUL E. PEARSON.